United States Patent

Brehmer et al.

[11] Patent Number: 5,875,390
[45] Date of Patent: Feb. 23, 1999

[54] PROGRAMMABLE INTERMEDIATE FREQUENCY RSSI SYSTEM INCLUDING AN ADJUSTABLE RECTIFYING STAGE

[75] Inventors: Geoffrey E. Brehmer, Lexington; Joe W. Peterson, Austin, both of Tex.

[73] Assignee: Advanced Micro Devices, Inc.

[21] Appl. No.: 761,400

[22] Filed: Dec. 6, 1996

[51] Int. Cl.⁶ .................................................. H04B 1/16
[52] U.S. Cl. ........................ 455/226.2; 455/308; 455/311
[58] Field of Search .................... 455/226.1, 226.2, 455/226.4, 251.1, 254, 67.1, 67.7, 308, 311

[56] References Cited

U.S. PATENT DOCUMENTS

| | | | |
|---|---|---|---|
| 5,507,022 | 4/1996 | Uomoto | 455/226.4 |
| 5,551,072 | 8/1996 | Watanabe | 455/226.1 |
| 5,603,107 | 2/1997 | Gottfried et al. | 455/226.2 |
| 5,689,814 | 11/1997 | Hagisawa et al. | 455/226.2 |

*Primary Examiner*—Edward F. Urban
*Attorney, Agent, or Firm*—Conley, Rose & Tayon, PC; B. Noel Kivlin

[57] ABSTRACT

An IF receiver system includes an IF signal path formed by an IF amplifier section, a bandpass filter, and a limiter section. An RSSI (Receive Signal Strength Indicator) circuit is coupled to the IF amplifier section and the limiter section and generates an RSSI output signal which varies linearly with logarithmic changes in input power. A storage unit is coupled to the RSSI circuit and is configured to store a value which controls current limiting associated with the RSSI circuit. In one specific implementation, the limiter section includes a plurality of serially coupled limiter stages. The RSSI circuit includes a plurality of rectifying stages, wherein a separate rectifying stage is coupled to an input of a corresponding limiter stage. An additional rectifying stage is coupled to an output of a last of the limiting stages. The value within the storage unit controls the extent of current limiting associated with the additional rectifying stage.

17 Claims, 6 Drawing Sheets

Top: RSSI Interstage Limiting without Filter Attenuation
Bottom: RSSI Interstage Limiting with Filter Attenuation

FIG. 5B

RSSI Output Versus Input Power

FIG. 6A

Top: RSSI Interstage Limiting without Filter Attenuation
Bottom: RSSI Interstage Limiting with Filter Attenuation and Preferred Embodiment

FIG. 6B

RSSI Output Versus Input Power

FIG. 7

PROGRAMMABLE INTERMEDIATE FREQUENCY RSSI SYSTEM INCLUDING AN ADJUSTABLE RECTIFYING STAGE

BACKGROUND OF THE INVENTION

1. Field of the Invention

The present invention relates to radio frequency communications systems, and more particularly to a novel system and method for reducing non-linearities in a Receive Signal Strength Indicator (RSSI) of a radio frequency system receiver.

2. Description of the Related Art

With the dramatic advances of deep submicron CMOS technology, the ability to integrate more and more radio functions into one piece of silicon is becoming possible. Radio functions within integrated circuits are generally partitioned into either an RF (radio frequency) chip and an IF (intermediate frequency) chip, or are partitioned into independent transmitter and receiver chips. Traditionally, RF and IF chips have been implemented in a BiCMOS, Bipolar, or Gallium Arsenide (GA) technology. However, more recently, these functions are being implemented with CMOS technology.

Figure 1:
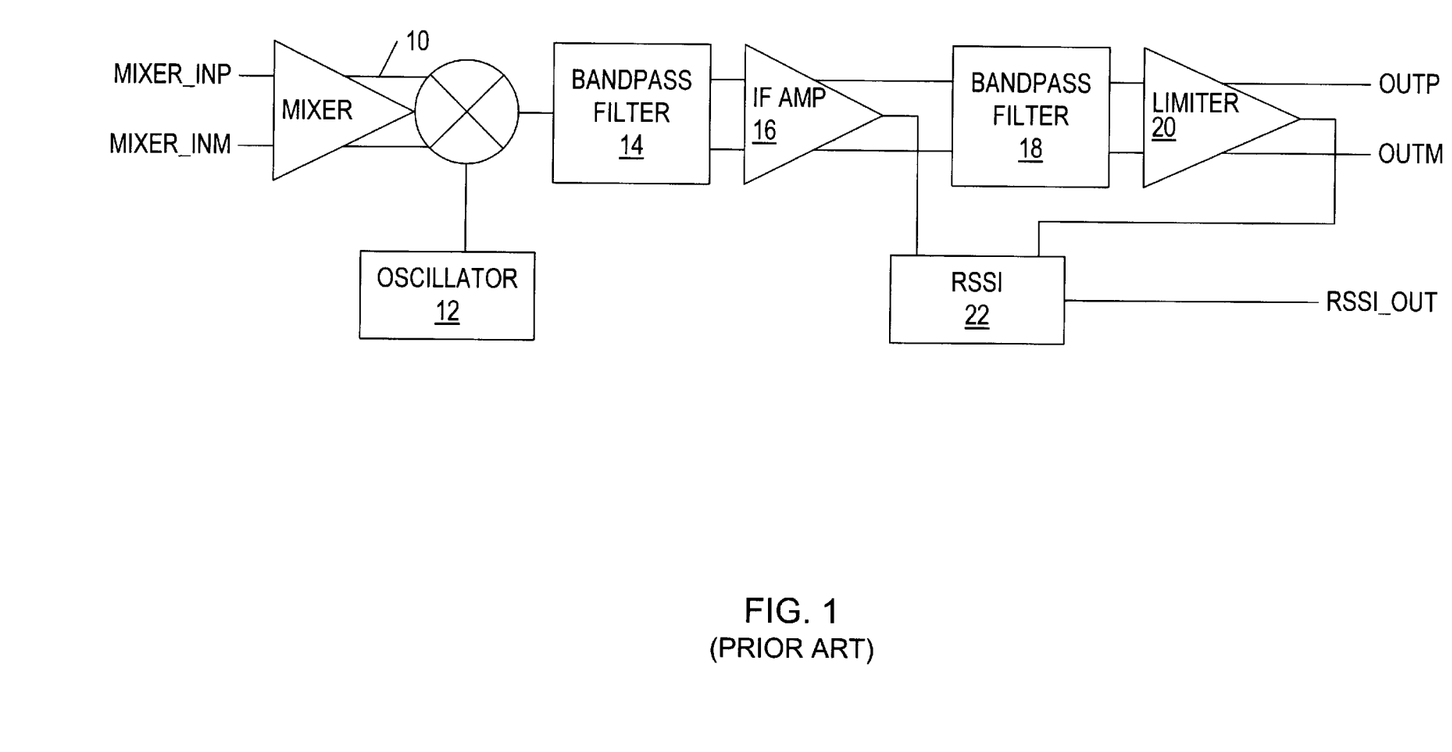
FIG. 1 is a block diagram of a typical prior art IF receiver system.

FIG. 1 schematically illustrates a typical prior art IF receiver system. As shown, the typical prior art IF receiver system comprises a mixer 10 and an oscillator 12 to down convert the differential RF input signal to an IF signal, a bandpass filter 14, an IF amplifier section 16, a second bandpass filter 18, a limiter 20, and an RSSI (Receive Signal Strength Indicator) circuit 22 that ranges over the entire IF input signal range.

The mixer 10 and oscillator circuit 12 in the IF system operate to first down convert the RF signal to an IF signal. The bandpass channel filter 14 then filters the IF signal to remove any unwanted mixing products. This signal is typically extremely small and can range from −100 dBm to 0 dBm, where dBm=10*log{P(mW)/1 mW}. The IF amplifier 16 amplifies the IF signal, and the amplified IF signal is then filtered by the bandpass filter 18. The signal output from the bandpass filter 18 is then provided to a very high gain limiter circuit 20. The gain limiter circuit outputs a voltage limited signal similar to a square wave. The voltage limited square wave signal is then sent to a baseband circuit (not shown) that converts the data bits into digital levels.

The IF system also implements a receive signal strength indicator function that outputs a linear signal over the entire receive input power range. This functionality is implemented by RSSI circuit 22. Since the input power range is extremely wide and digital baseband chips have a limited power supply range, the RSSI function is required to be logarithmic.

Figure 2:
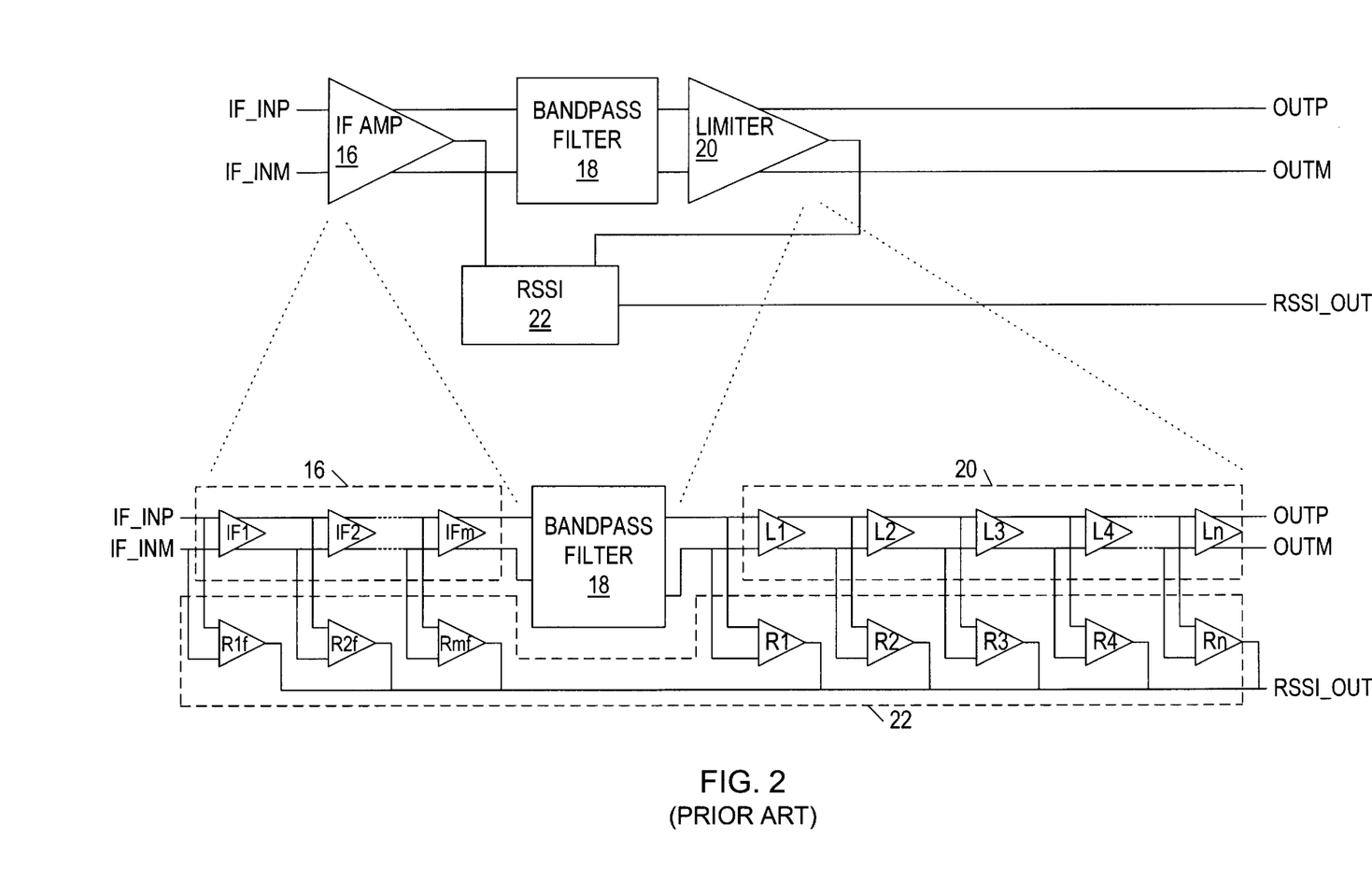
FIG. 2 is a more detailed block diagram of the IF receiver system of FIG. 1.

FIG. 2 is a more detailed block diagram schematically illustrating the prior art architecture for the IF amplifier 16, limiter 20, and RSSI circuit 22. FIG. 2 also illustrates the manner in which the bandpass filter 18 is interposed between the amplifier and limiter stages. FIG. 2 finally depicts the manner in which the RSSI circuitry is integrated over the entire signal path, from the IF amplifier inputs to the limiter outputs.

The IF amplifier section is represented with "Mm" gain stages labeled IF1, IF2, . . . IFm. Likewise, the limiter section is represented with "n" gain stages, labeled L1, L2, L3, L4, . . . Ln. The basic operation of the RSSI circuit 22 is to perform a full wave rectification and current limit function at each IF amplifier gain and limiter stage. The RSSI circuit 22 creates a piecewise linear logarithmic function with respect to changes in input power, and the RSSI_OUT node is typically terminated into a resistive load to create a linear output voltage. The blocks labeled R1$f$, R2$f$, through Rm$f$ each represent identically configured full wave current rectification circuit for each of the IF amplifier stages, and the blocks labeled R1, R2, R3, R4, through Rn each represent an identically configured full wave rectification circuit for each limiter gain stage.

The prior art circuit of FIG. 2 works quite well and is extremely linear when the intermediate bandpass filter is lossless. Many IF systems, however, require that the intermediate filter have some attenuation in order to stabilize the receiver. This attenuation can create many problems for the RSSI function. For example, variances in the attenuation can create changes in the relationship between input power and RSSI output and changes in the overall operating range, thereby deleteriously affecting the RSSI consistency and linearity.

SUMMARY OF THE INVENTION

The problems outlined above are in large part solved by an improved intermediate frequency RSSI system in accordance with the present invention. In one embodiment, an IF receiver system includes an IF signal path formed by an IF amplifier section, a bandpass filter, and a limiter section. An RSSI (Receive Signal Strength Indicator) circuit is coupled to the IF amplifier section and the limiter section and generates an RSSI output signal which varies linearly with logrithmic changes in input power. A storage unit is coupled to the RSSI circuit and is configured to store a value which controls current limiting associated with the RSSI circuit. In one specific implementation, the limiter section includes a plurality of serially coupled limiter stages. The RSSI circuit includes a plurality of rectifying stages, wherein a separate rectifying stage is coupled to an input of a corresponding limiter stage. An additional rectifying stage is coupled to an output of a last of the limiting stages. The value within the storage unit controls the extent of current limiting associated with the additional rectifying stage. Other rectifying stages may also be controlled by the storage unit. An improved intermediate frequency RSSI system in accordance with the invention may advantageously attain consistent and linear RSSI generation regardless of the attenuation value of the bandpass filter.

Broadly speaking, the present invention contemplates an intermediate frequency (IF) system comprising an IF signal path including a plurality of series-coupled gain stages. A bandpass filter is interposed in series between a first subset of the plurality of series-coupled gain stages and a second subset of the plurality of series-coupled gain stages. A receive signal strength indicator circuit is coupled to the plurality of series-coupled gain stages and to a storage unit. An output of the receive signal strength indicator signal is dependent upon a control value programmed within the storage unit and is indicative of an input signal strength.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
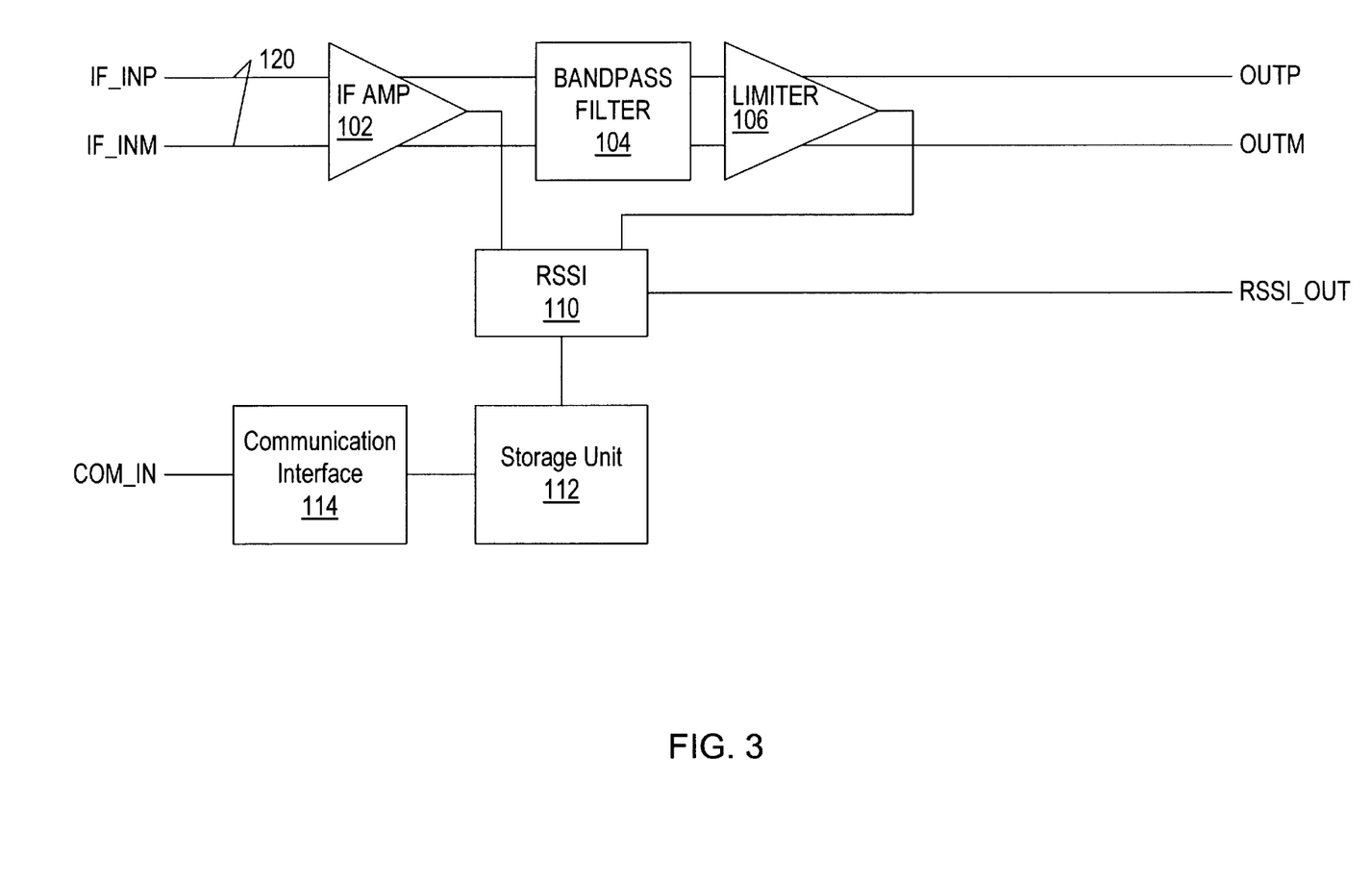
FIG. 3 is a block diagram of an intermediate frequency system in accordance with one embodiment of the present invention.

Turning next to FIG. 3, a block diagram is shown of an intermediate frequency system in accordance with one embodiment of the present invention. The system of FIG. 3 includes an IF signal path formed by an IF amplifier section 102, a bandpass filter 104, and a limiter section 106. An RSSI (Receive Signal Strength Indicator) circuit 110 is shown coupled to IF amplifier section 102 and to limiter section 106. A storage unit 112 is finally shown coupled between RSSI circuit 110 and a communication interface 114.

During operation, IF amplifier section 102 receives and amplifies a differential IF input signal at lines 120. The resulting IF amplifier output signal is then passed through bandpass filter 104 which filters extraneous content of the IF amplifier output signal. Bandpass filter 104 may further be configured to attenuate the signal, as described further below. The attenuation of bandpass filter 104 may be controlled by, for example, an L-C circuit coupled external to an integrated circuit upon which the IF amplifier section 102, limiter section 106, RSSI circuit 110, and storage unit 112 are fabricated. The output signal of bandpass filter 104 is provided to limiter section 106 which operates to output a voltage limited square wave-like signal that may be sent to, for example, a baseband circuit that converts the data bits into digital levels.

RSSI circuit 110 receives inputs from IF amplifier section 102 and limiter section 106. RSSI circuit 110 generates an RSSI output signal that varies linearly with logrithmic variations in the power of the differential IF input signal. Generally speaking, storage unit 112 is configured to store a value that controls the generation of the RSSI output signal by RSSI circuit 110 depending upon an attenuation value of bandpass filter 104. Communication interface 114, which may be, for example, a serial or parallel port, allows a user to program the value stored within storage unit 112 depending upon the attenuation value of bandpass filter 104. Storage unit 112 may be implemented, for example, using one or more registers or using any other storage mechanisms. Further details regarding one embodiment of RSSI circuit 110 and limiter section 106 are provided further below.

Figure 4:
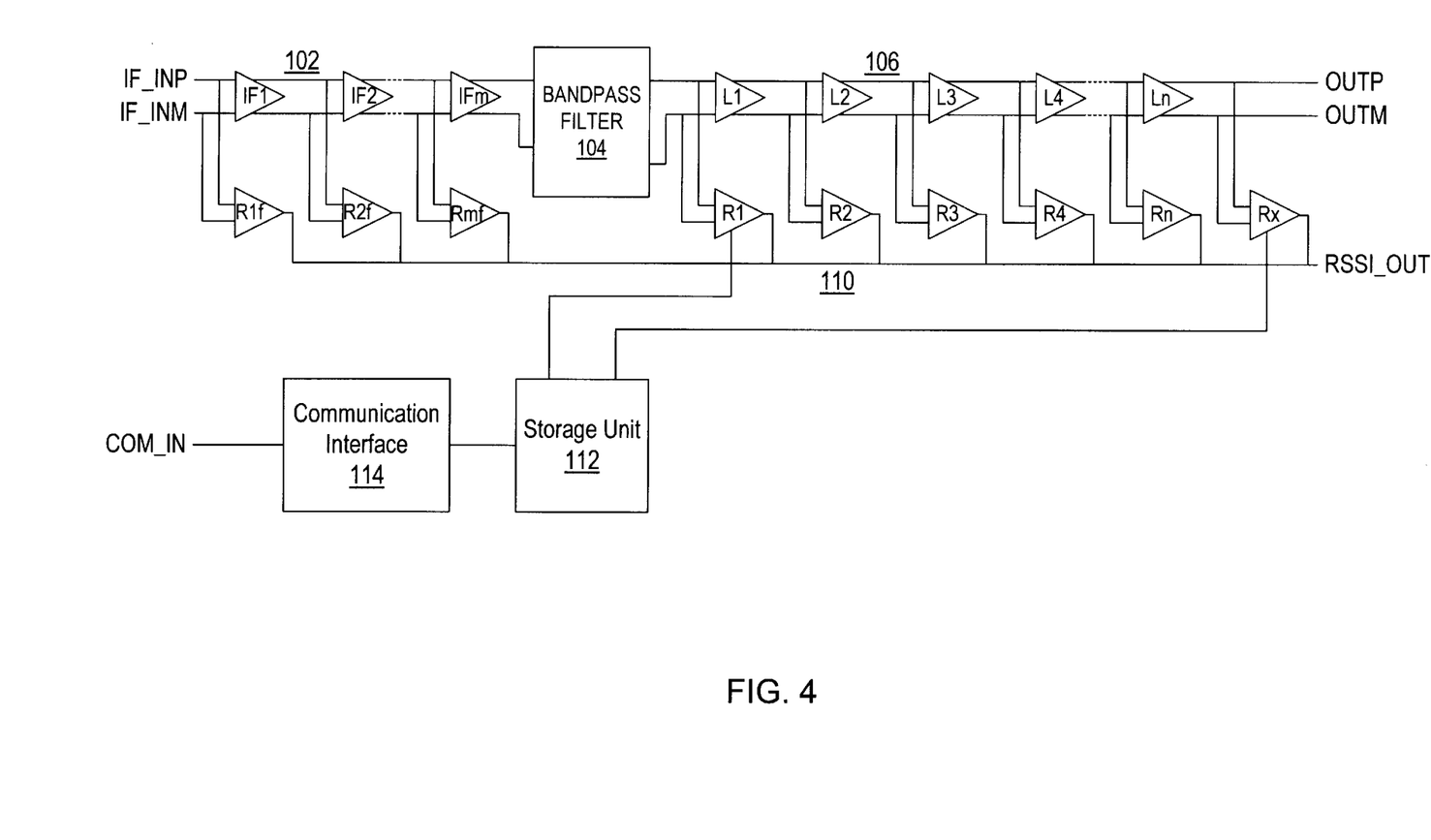
FIG. 4 is a block diagram illustrating details of one implementation of an intermediate frequency system in accordance with the present invention.

FIG. 4 illustrates details of one implementation of the intermediate frequency system of FIG. 3. Circuit portions that correspond to those of FIG. 3 are numbered identically for simplicity and clarity. In the embodiment of FIG. 4, IF amplifier stage 102 is illustratively formed by a plurality of amplifier stages 102-1 through 102-m. Limiter section 106 is formed by a plurality of limiter stages 106-1 through 106-n. The RSSI circuit 110 is formed by rectifying stages R1f through Rmf, rectifying stages R1 through Rn, and a final rectifying stage Rx. It is noted that each of the stages of IF amplifier stage 102 and limiter section 106 may be implemented using identical amplifier circuitry. For normal input levels, the amplifier forming each of the limiter stages of limiter section 106 reaches current limiting.

In the embodiment of FIG. 4, a control line (or lines) is coupled between storage unit 112 and the final rectifying stage Rx to allow a user to program the current limiting value associated with the rectifying stage Rx, and to control whether the stage is on or off. An additional control line (or lines) may further be coupled between storage unit 112 and rectifying stage R1 to control the current limiting value associated with that stage.

FIGS. 5a, 5b, 6a, and 6b graphically illustrate functional differences between the prior art system of FIG. 1 and the system of FIG. 4. The top graph of 5a illustrates each corresponding RSSI interstage output as a function of the input power for the prior art system of FIG. 2 where the bandpass filter 18 is lossless (i.e., has an attenuation of 0 dB). Input power increases from left to right for FIGS. 5a, 5b, 6a, and 6b. As illustrated by the top graph of FIG. 5a, the first RSSI rectifying stage to reach current limiting is Rn, followed by R4, R3, R2, R1, Rnf, R2f, and lastly R1f. It is noted that current limiting occurs at even intervals of the signal path gain.

Figure 5A:
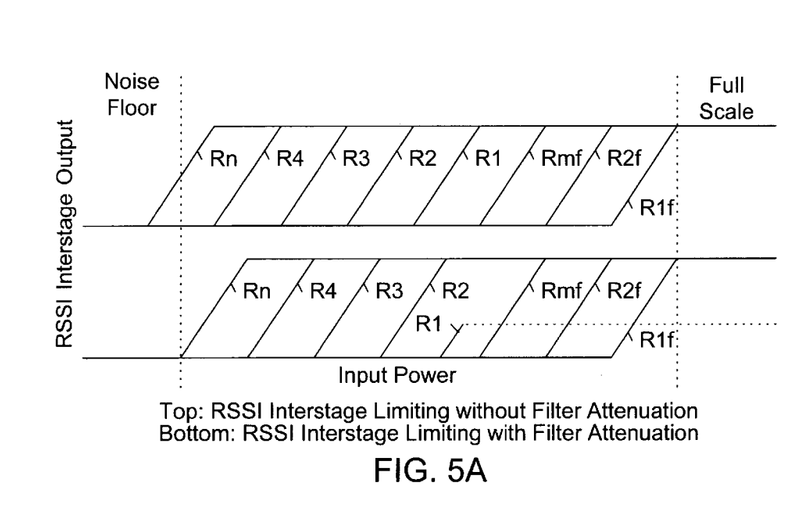
FIG. 5a is a graph illustrating RSSI interstage limiting without and with filter attenuation for the IF receiver system of FIG. 2.
Figure 5B:
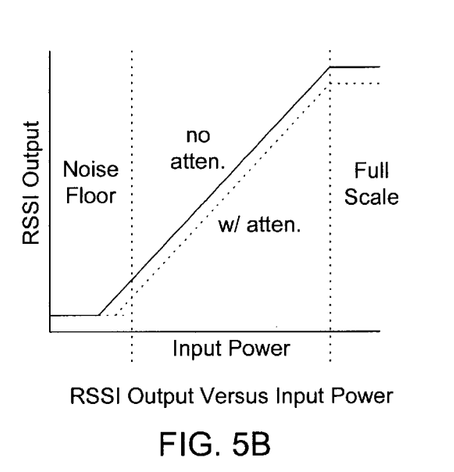
FIG. 5b is a graph illustrating RSSI output verses input power for the IF receiver system of FIG. 2.

The bottom graph of FIG. 5a illustrates the manner in which filter attenuation shifts the current limiting characteristics of the system of FIG. 2, with respect to input power. Each limiting stage R1f through Rmf reaches limiting at an input power level increased by the filter attenuation amount. The first RSSI rectifying stage R1 following bandpass filter 18 will never reach limiting because it's input will never reach a large enough value due to the bandpass filter 18 attenuation. This effect is illustrated with the dotted line on the bottom graph of FIG. 5a. FIG. 5b graphically illustrates the overall RSSI output as a function of input power for the prior art system of FIG. 2 with and without filter attenuation. The dotted line of FIG. 5b illustrates the system with filter attenuation and the solid line represents the system without filter loss.

Figure 6A:
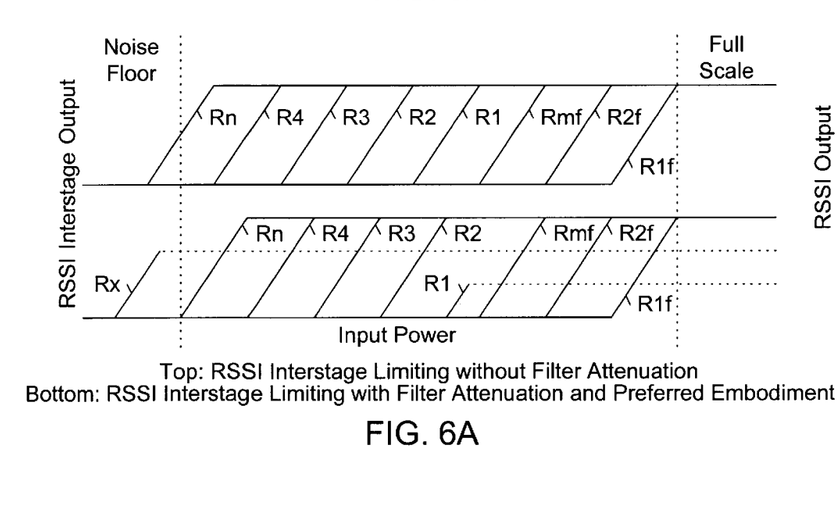
FIG. 6a is a graph illustrating RSSI interstage limiting without and with filter attenuation for the intermediate frequency system of FIG. 4.
Figure 6B:
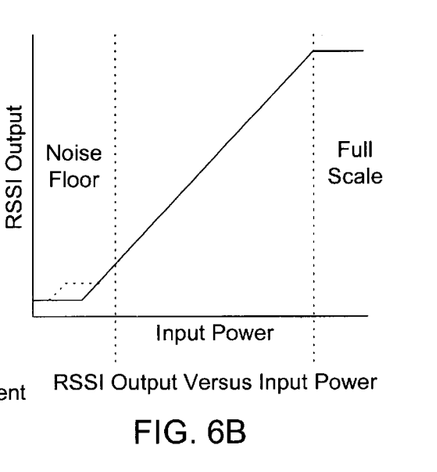
FIG. 6b is a graph illustrating RSSI output verses input power for the intermediate frequency system of FIG. 4.

FIGS. 6a and 6b graphically illustrate the performance of the IF system of FIG. 4. The top graph of FIG. 6a illustrates the case where the filter attenuation of bandpass filter 104 is lossless. For this situation, the storage unit 112 is programmed with a value such that the RSSI rectifier R1 is turned on and the final RSSI rectifier stage Rx is turned off. As illustrated by the top graph of FIG. 6a, the performance of the system of FIG. 4 during this situation is similar to that of the circuit of FIG. 2 when no attenuation is introduced by the corresponding bandpass filter. It is noted that since the final RSSI rectifying stage Rx is turned off, this stage does not contribute to the overall RSSI output signal.

The bottom graph of FIG. 6a illustrates the manner in which the system of FIG. 4 operates when a positive attenuation is associated with bandpass filter 104 and the system is programmed to remove the filter attenuation effects. Here the final RSSI rectifying stage Rx is turned on and programmed to limit its rectifying current such that its current limited value plus the current limited value of the rectifying stage R1 sum together as to not change the overall RSSI full scale output. That is, the current limited value of the final RSSI rectifying stage Rx is set (by the value within storage unit 112) such that the sum of the maximum current value contributed by the rectifying stage R1 plus the current limited value of the final RSSI rectifying stage Rx equals the interstage current limited value of each of the other rectifying stages R1f through Rmf and R2 through Rn. This is observed in FIG. 6b where the dotted line of the attenuated system overlays with the solid line of the lossless system. The effect of adding the Rx rectifying stage creates a non-linearity at very low input levels, as can be seen with the dotted line of FIG. 6b. This however can be defined to occur below the noise floor of the system such that it will not effect the linearity within the specified operating range. It is contemplated that the value within storage unit 112 may further control the current limiting associated with other rectifying stages, such as stage R1.

Figure 7:
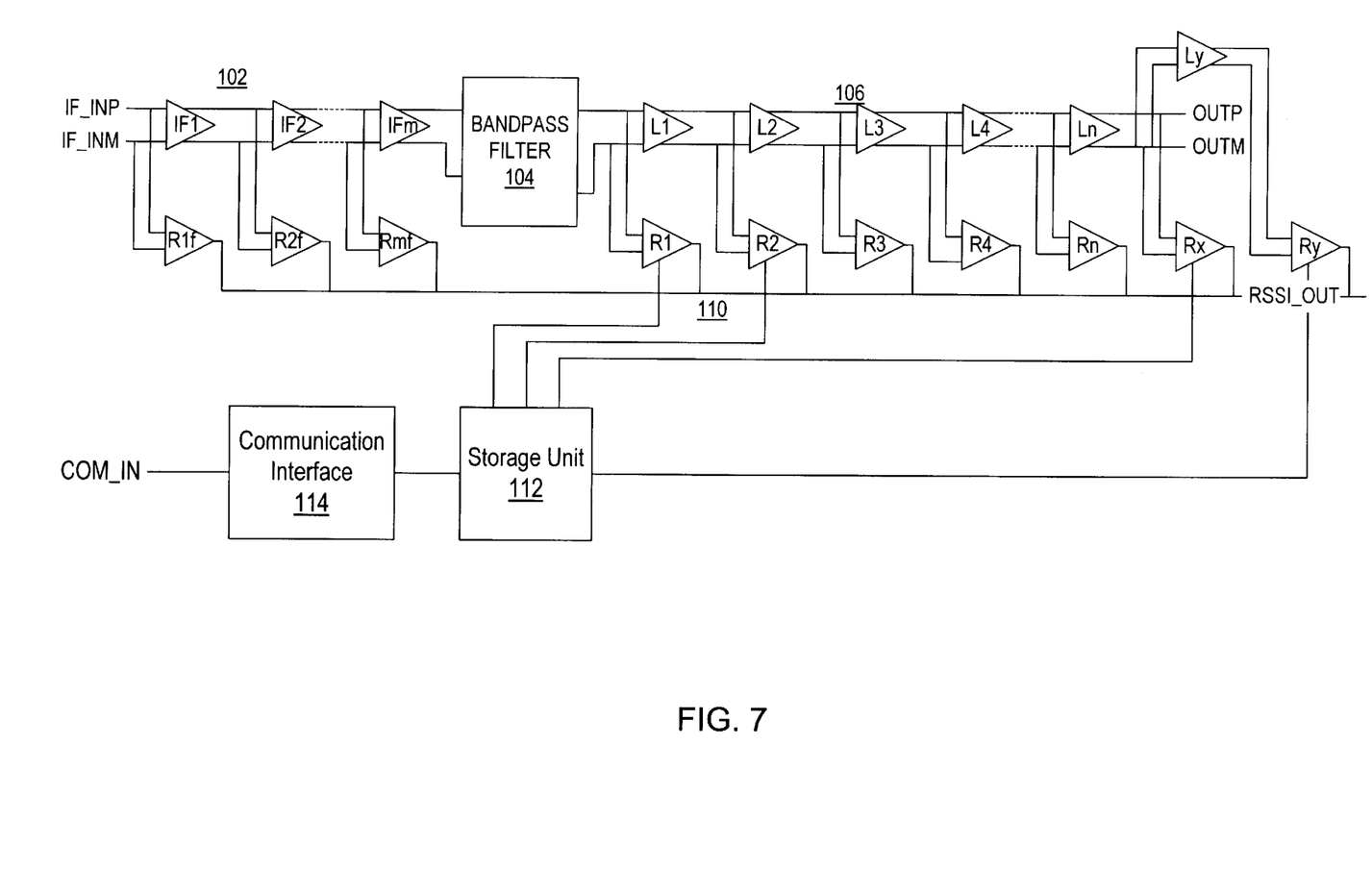
FIG. 7 is a block diagram of an intermediate frequency system in accordance with another embodiment of the present invention.

The system schematically illustrated by FIG. 4 is designed for situations wherein the filter attenuation is less than one intermediate gain stage value. The programmable concept may be adapted for systems that have filter attenuations of greater than the gain of one gain stage. FIG. 7 illustrates such an embodiment. Circuit portions that correspond to those of FIG. 4 are numbered identically for simplicity and clarity.

In the system of FIG. 7, an additional rectifying stage Ly is coupled to the limiter stage Ln output, and an additional RSSI rectifying stage Ry is coupled to an output of the additional rectifying stage Ly. If the bandpass filter attenuation is set at greater than one intermediate gain stage value and at less than the total gain of two intermediate gain stages, the value within storage unit 112 is set to turn the rectifying stage Rx full-on (i.e., current limit to the same extent as each of the rectifying stages R1f through Rmf, R3, R4). The current limiting of additional limiter stage Ry is set (by the value within storage unit 112) such that its current limited value plus the contribution by rectifying stage R2 equals the current limited value of each of the rectifying stages R1f through Rmf, R3 and R4. Additional limiting and rectifying stages may similarly be coupled for systems with larger bandpass filter attenuation values.

The programmable nature for correcting non-linear effects within the IF system is also not limited to a signal path that is defined with one IF amplifier section, one filter, and one limiter section. It can be modified to accommodate multiple breaks within the signal path by simply adjusting where to add more rectifying stages and by programming each stage of remove the non-linear characteristics caused by the system partitioning.

Numerous variations and modifications will become apparent to those skilled in the art once the above disclosure is filly appreciated. It is intended that the following claims be interpreted to embrace all such variations and modifications.

What is claimed is:

1. An intermediate frequency (IF) system comprising:
   an IF signal path including a plurality of series-coupled gain stages;
   a bandpass filter interposed in series between a first subset of said plurality of series-coupled gain stages and a second subset of said plurality of series-coupled gain stages;
   a plurality of rectifying stages, wherein each rectifying stage is coupled at a predetermined node of said IF signal path, and wherein at least one of said plurality of rectifying stages is an adjustable rectifying stage whereby a current limited value associated with said adjustable rectifying stage is adjustable; and
   a storage unit coupled to said adjustable rectifying stage and configured to store a control value which controls said current limited value of said adjustable rectifying stage;
   wherein said adjustable rectifying stage is coupled at an output of said IF signal path, and wherein said current limited value is set by said control value of said storage unit to substantially equal a difference between a current limited value associated with a first of said plurality of rectifying stages and a current contribution associated with a second of said plurality of rectifying stages, wherein said second of said plurality of rectifying stages is coupled to a second node of said IF signal path that is subsequent to said bandpass filter.

2. The intermediate frequency system as recited in claim 1, wherein each of said plurality of series-coupled gain stages is configured with an equal gain.

3. The intermediate frequency system as recited in claim 1, further comprising a communication interface coupled to said storage unit and configured to accommodate a storage of a new control value within said storage unit.

4. The intermediate frequency system as recited in claim 3, wherein said communication interface is a serial port.

5. The intermediate frequency system as recited in claim 3, wherein said communication interface is a parallel port.

6. The intermediate frequency system as recited in claim 1, wherein a separate rectifying stage is provided for each of said plurality of series-coupled gain stages.

7. The intermediate frequency system as recited in claim 1, wherein said adjustable rectifying stage is coupled to an output node of a final gain stage of said plurality of series-coupled gain stages.

8. The intermediate frequency system as recited in claim 1, wherein each of said plurality of rectifying stages is configured to generate an output signal having a current that is substantially linearly dependent upon a logarithmic function of an input power to said each of said plurality of rectifying stages.

9. The intermediate frequency system as recited in claim 1, wherein said current limited value is associated with each of said plurality of series-coupled gain stages forming said first subset of said plurality of series-coupled gain stages.

10. An intermediate frequency (IF) system comprising:
   an IF signal path including a plurality of series-coupled gain stages;
   a bandpass filter interposed in series between a first subset of said plurality of series-coupled gain stages and a second subset of said plurality of series-coupled gain stages;
   a storage unit configured to store a control value; and
   a receive signal strength indicator circuit coupled to said plurality of series-coupled gain stages and to said storage unit, wherein a current limited value associated with at least one of said plurality of series-coupled gain stages is set by said control value to substantially equal a difference between a current limited value associated with a first of said plurality of series-coupled gain stages and a current contribution associated with a second of said plurality of series-coupled gain stages, wherein said second of said plurality of series-coupled gain stages is coupled to a second node of said IF signal path that is subsequent to said bandpass filter, and wherein an output of said receive signal strength indicator signal is dependent upon said control value and is indicative of an input signal strength.

11. The intermediate frequency system as recited in claim 10, further comprising a communication interface coupled to said storage unit and configured to accommodate a storage of a new control value within said storage unit.

12. The intermediate frequency system as recited in claim 11, wherein said communication interface is a serial port.

13. The intermediate frequency system as recited in claim 11, wherein said communication interface is a parallel port.

14. The intermediate frequency system as recited in claim 10, wherein said receive signal strength indicator circuit is configured such that said control value controls current limiting associated with said receive signal strength indicator circuit.

15. The intermediate frequency system as recited in claim 10, wherein said receive signal strength indicator circuit includes a plurality of rectifying stages, wherein each of said rectifying stages is coupled at a predetermined node of said IF signal path.

16. The intermediate frequency system as recited in claim 15, wherein said receive signal strength indicator circuit further includes a final rectifying stage coupled to an output node of said IF signal path, wherein a current limited value associated with said final rectifying stage is adjustable depending upon said control value.

17. The intermediate frequency system as recited in claim 16, wherein a separate rectifying stage is provided for each of said plurality of series-coupled gain stages.

* * * * *